May 3, 1927.
L. D. NILSON
LIFTING JACK
Filed Nov. 18, 1925    3 Sheets-Sheet 2
1,627,526
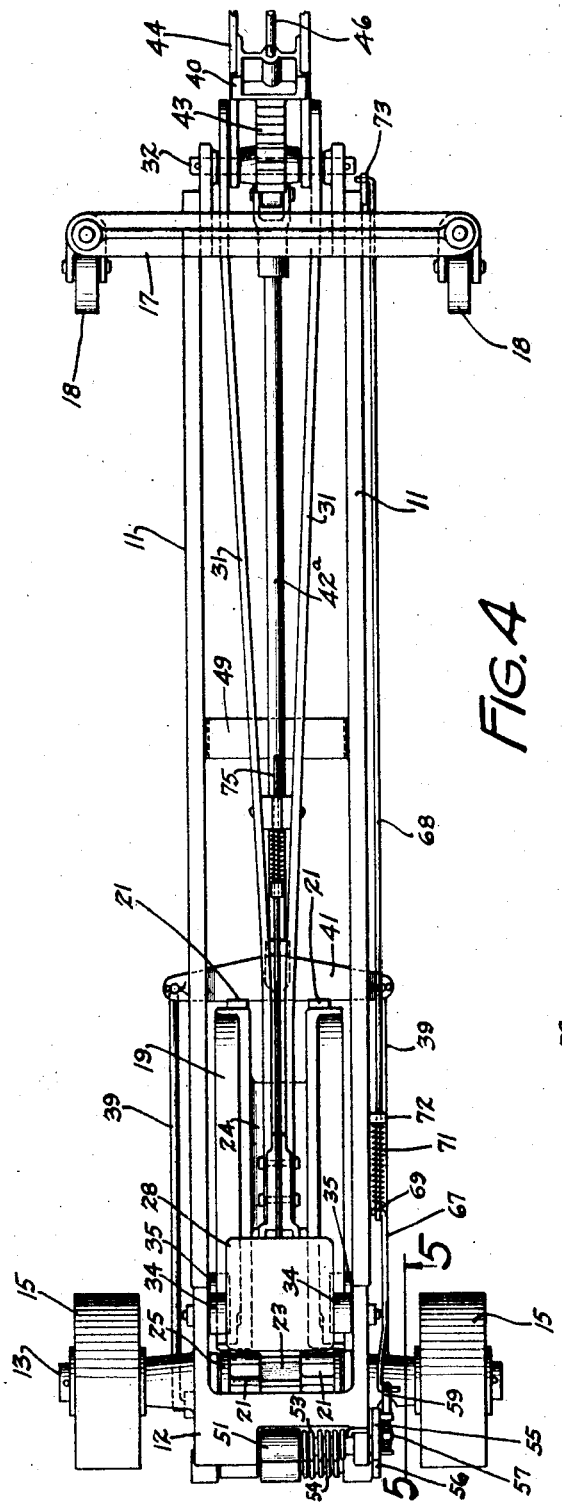
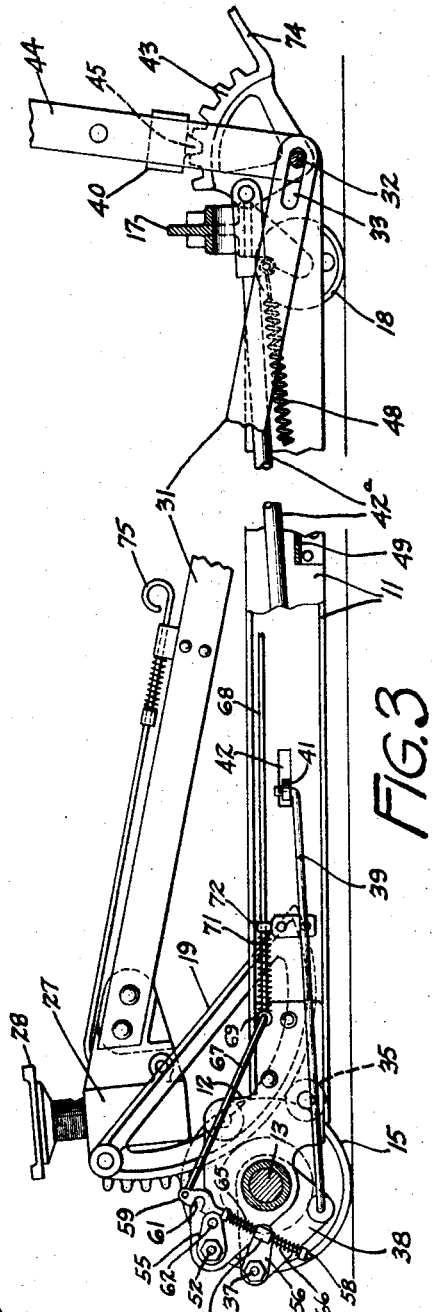
INVENTOR
LEONARD D. NILSON
ATTORNEYS May 3, 1927.
L. D. NILSON
LIFTING JACK
Filed Nov. 18, 1925
1,627,526
3 Sheets-Sheet 3
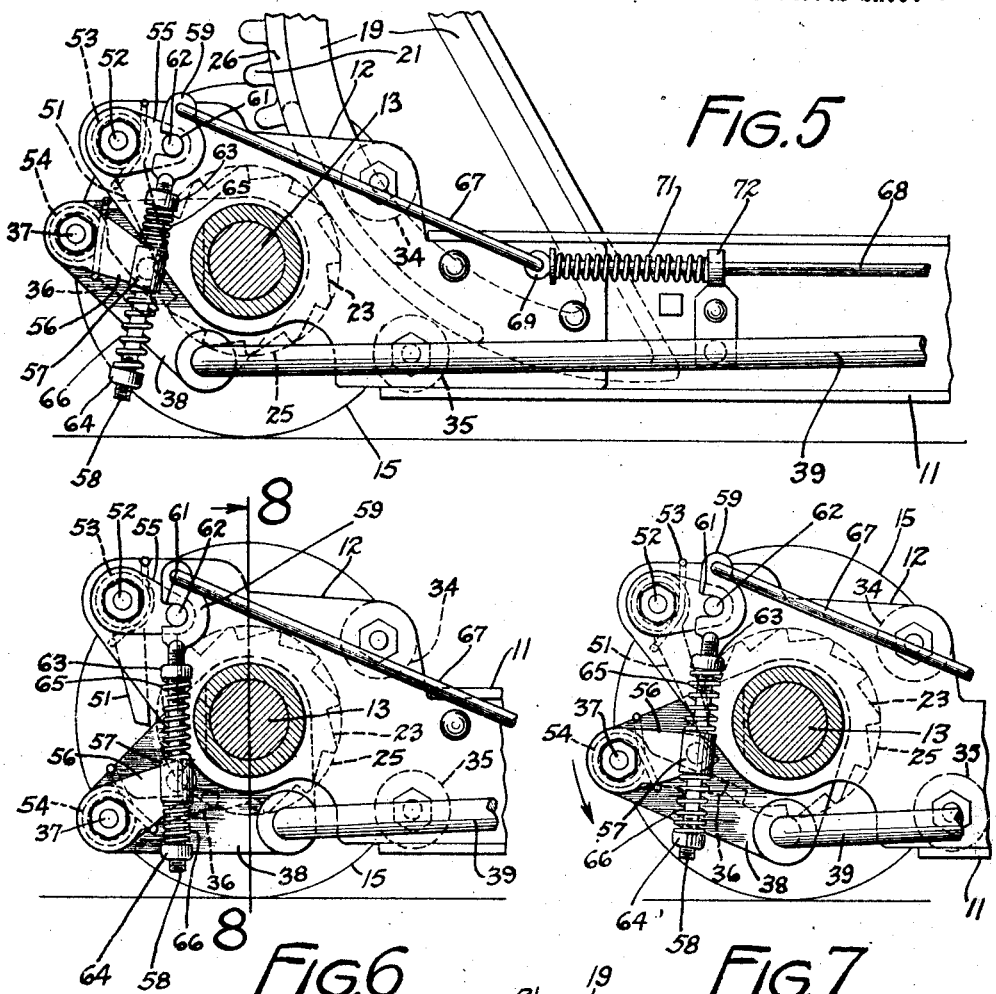
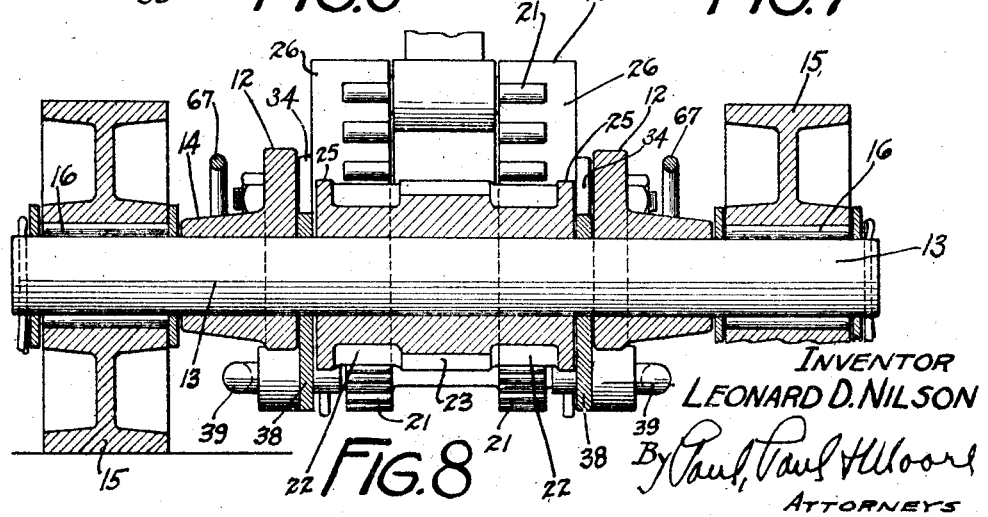
INVENTOR
LEONARD D. NILSON
By Paul, Paul & Moore
ATTORNEYS Patented May 3, 1927.

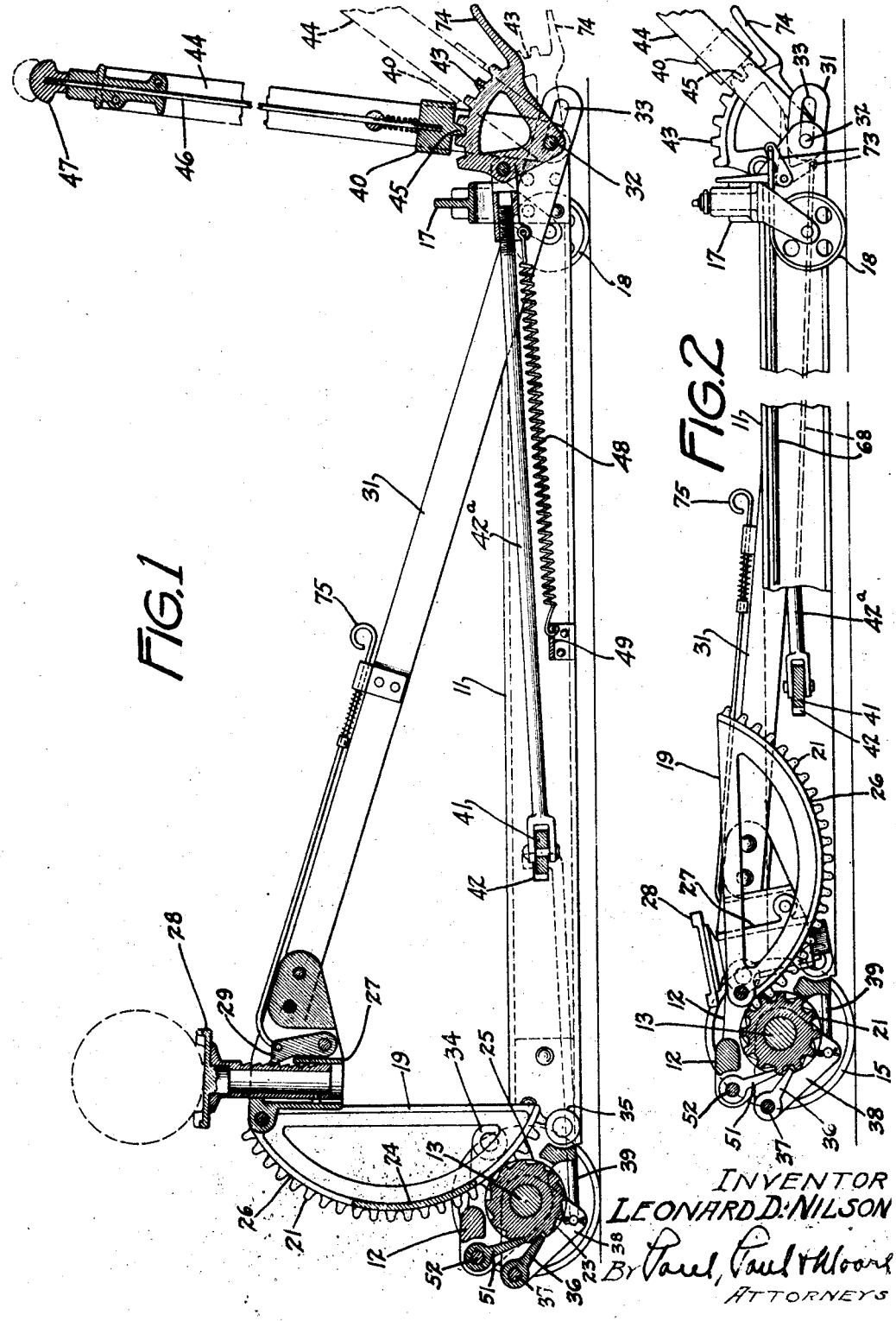

1,627,526

UNITED STATES PATENT OFFICE.

LEONARD D. NILSON, OF WAYZATA, MINNESOTA.

LIFTING JACK.

Application filed November 18, 1925. Serial No. 69,851.

This invention relates to new and useful improvements in lifting jacks adapted particularly for use in garages and repair shops for lifting the axles of automobiles, trucks and other vehicles, and particularly relates to the type usually known as dolly jacks, mounted upon suitable casters and adapted to lift and support one end of a vehicle to permit the removal of the tires or wheels therefrom, and which will, at the same time, allow the vehicle to be moved from place to place in the garage after the wheels and tires are removed from the axles.

In the use of jacks of this type, difficulty has been experienced particularly with cars or trucks having balloon tires in obtaining the desired degree of lift or elevation of the axle or portion of the car to which the jack is applied, and this is particularly noticeable when the jack is used on a floor, as it usually is, where there is no pit or depression beneath the car or the jack to receive the lifting member or element when in its lowered or down position. Hence the primary object of my invention is to provide an apparatus in which the lifting member has a long stroke, or movement that is desirable in raising trucks and cars off the floor, particularly those with balloon tires, and is adapted to assume a position in its supporting frame when lowered where no pit or depression is necessary to receive it. In other words, the lifting element having an extreme lifting stroke, does not have to be lowered below its supporting frame or the floor line when in its down position, and at the same time is adapted for any extreme degree of lift that may be required.

The particular object of the invention, therefore, is to provide a lifting apparatus which, when in lowered non-lifting position, will be comparatively low to allow it to be inserted under an axle when the tires are deflated, thereby providing a structure particularly well adapted for lifting the axles of automobiles equipped with balloon tires, and the lifting range of which is also greater than that of jacks in use at the present time, thereby providing a jack well adapted for garages and repair shops for lifting all types and sizes of automobiles or other vehicles.

Other objects of the invention will appear from the following description and the accompanying drawings and will be pointed out in the annexed claims.

In the drawings there has been disclosed a structure designed to carry out the various objects of the invention, but it is to be understood that the invention is not confined to the exact features shown, as various changes may be made within the scope of the claims which follow.

In the accompanying drawings forming part of this specification.

Figure 1 is a sectional elevation of the improved jack showing it in raised or lifting position;

Figure 2 is a similar view showng the jack in lowered or non-lifting position;

Figure 3 is a side elevation, partially broken away, showing the rack member partially raised to lift a load;

Figure 4 is a plan view of Figure 2;

Figure 5 is an enlarged detail sectional view on the line 5—5 of Figure 4 showing the ratchet device provided for actuating the rack member;

Figures 6 and 7 are similar views showing the parts in different positions; and

Figure 8 is a cross-sectional view on the line 8—8 of Figure 6.

The main frame of the novel structure featured in this invention preferably consists of a pair of spaced beams 11 having their rear end portions secured to a yoke 12 in which a shaft 13 is rotatably mounted in suitable bearings 14 provided therein. Carrying wheels 15 are rotatably mounted upon the shaft 13 on suitable anti-friction bearings 16 as shown in Figure 8. The forward end portions of the side beams 11 are suitably secured to a cross member 17 having swivel casters 18 mounted therein to support the forward end of the jack. The above described parts provide in effect a substantial truck frame upon which the operating mechanism of the jack is mounted.

An important feature of this invention resides in the novel construction of the lifting mechanism provided at the rear end of the jack. This mechanism comprises a sector shaped lifting member 19 having preferably two rows of rack teeth 21 provided thereon as particularly shown in Figure 8. These rack teeth or racks are spaced apart and are adapted to mesh with a pair of rack pinions 22 integrally formed preferably with a ratchet wheel 23 interposed therebetween. The pinions 22 and ratchet wheel 23 are loosely mounted upon the shaft 13. The lifting member 19 preferably comprises two sections suitably connected together by means of a web 24 as particularly shown in Figure 1. In the construction here shown, the above mentioned sections and the web 24 are integrally formed in one casting, although it is to be understood that if desired the two sections of the lifting member may be independently formed and thereafter suitably secured together in spaced relation to form a unitary structure by such means as tie rods or other suitable connecting means. Circular discs 25 are provided adjacent each rack pinion 22 adapted to engage the opposed flanges 26 of the lifting member 19. The discs 25 and flanges 26 function to space the rack teeth 21 from the pinions 22, thereby causing the intermittent movement of the lifting member 19, when lifting a load, to be smooth, which would be practically impossible if the weight of the load were carried directly upon the teeth.

A socket casting 27, having a swiveled lifting head 28 adjustably mounted therein by means of a ratchet device 29, is pivotally connected to one end of the lifting member 19. A pair of bars 31 are secured to the socket casting 27 and have their lower or forward ends slidably mounted upon a short shaft or stud 32 mounted adjacent the forward end portions of the side beams 11 of the jack frame. These bars have an important function in the operation of the jack, as they guide the movement of the lifting end of the member 19 and at the same time provide a support or brace therefor, when the jack is lifting a load, especially when the lifting member is in the position shown in Figure 1. Elongated openings or slots 33 are provided in the forward ends of the bars 31 to permit the bars to move longitudinally during the lifting movement of the member 19. During the movement of the lifting member from its normal inactive position as shown in Figure 2 of the drawings, to the position it assumes when in raised position as shown in Figure 1 of the drawings, the bars 31 move longitudinally and the slot 33 in one end of each of the bars 31 permits the longitudinal movement necessarily imparted to the bars 31 when the sector shaped lifting member 19 is moved from its lowered to raised position. The slot 33 of course, allows or compensates for this movement of the bars 31.

The slot and pin connection may be referred to as a "lost motion connection" or as a "pivotal and sliding connection" between one end of the bars 31 and the frame or beams 11. The bars 31 function after the lifting member has been initially raised, that is, while the lifting member is first being raised the bars simply move longitudinally with the lifting member and the shaft 32 within the slot does not in any way function to brace or cause the bars 31 to be braced until after the lifting member has been moved to its raised position and then the bars 31 have one end of the slot resting against the shaft 32 and this holds the bars 31 in their inclined or raised position where the bars and lifting member form a truss arrangement. Suitable guide rollers 34 and 35 are provided on each side of the yoke 12 adapted to engage the opposed flanges 26 of the lifting member for the purpose of guiding it when being moved from its non-lifting position, shown in Figure 2, to the load-lifting position shown in Figure 1.

During the initial movement of the lifting member from its inactive position towards its raised position the lifting member travels upon and is supported and guided by the rollers 34 and 35 as well as the meshing of the rack bar with the pinion. During such initial movement the bars 31 do not function and may be said to remain inactive and this is true until the lifting member has been moved substantially to raised position and then the upper end of the lifting member will be braced relative to one end of the frame through the bars 31. The shaft 32 is then in engagement with the end of the slot closest to the lifting member and when in this position as shown in Figure 1, the connection between the bar 31 and the frame 11 is such as to permit the bars 31 to function for bracing and supporting the lifting member in its raised position.

The sector-shaped lifting member, it will be noted, is substantially horizontal in its non-working position and above the floor line, and while this lifting member has a comparatively long stroke and is capable of insertion under the axle of a car, on account of its normal lowdown position, it is adapted to raise to the desired elevation any type of car or truck or other vehicle equipped with balloon or other tires, and all this can be accomplished without having the lifting member move down into a pit or depression in the floor or below the floor line of the supporting frame. I am thus able with a simple but strong and durable mechanism, to effect the desired lift to any type of vehicle or in fact any other object to be lifted, without having to place the jack in any particular position or spot in the garage or repair shop where it may be used. In other words, it is not necessary in order to obtain the extreme stroke of this jack to provide for movement of the lifting member below the level of the frame in which it is mounted. I prefer this sector-shaped lifting member on account of its strength and simplicity and ease of manufacture and operation, but it will be understood that modifications of this device may be devised which will employ substantially the same mechanical principles having a long upward stroke and require no space beneath the frame for the down stroke. I regard, therefore, all such devices operating mechanically, within the scope of my present invention.

The means provided for operating the lifting member 19 consists of a lifting pawl 36 mounted upon a shaft 37 rotatably mounted in suitable bearings provided in a pair of triangular plates 38 loosely mounted upon the shaft 13 as shown in the drawings. Rods 39 operatively connect the plates 38 with an equalizer bar 41 having its opposed ends projecting through elongated openings or slots 42 in the vertical webs of the side beams 11 of the jack frame (see Figures 1, 2, 3 and 4). A connecting rod 42ª connects the equalizer bar 41 with a quadrant 43 pivotally mounted upon the shaft 32 at the forward end of the frame. An operating lever 44 is adjustably connected to the quadrant 43 by means of a slidably mounted block 40 having a tooth 45 thereon adapted to engage the notches in the quadrant 43 as shown in Figure 1. The block 40 is operable by means of a rod 46 having a hand grip 47 secured to the upper end thereof. A tension spring 48 has one end connected to the connecting rod 42 and its other end connected to a cross member 49 secured to the side beams 11 of the frame. This spring functions to normally maintain the lifting pawl 36 in its starting position shown in Figures 1, 2, 3 and 5. When the operating lever 44 is moved from the full to the dotted line position shown in Figure 1, the lifting pawl will engage one of the teeth in the ratchet wheel 23 and cause it to be partially rotated, and it is therefore necessary that means be provided for holding the ratchet to prevent it from rotating backwards when the lifting pawl is being moved from the position shown in Figure 6 to that shown in Figures 1, 2 and 5. This will readily be understood as a result of the weight of the load upon the lifting member 19 tending to rotate the rack pinions 22 and therefore the ratchet 23 in the reverse direction from that followed when lifting a load.

A holding pawl 51 is therefore provided and adapted to engage the ratchet wheel 23 to prevent it from rotating backwards. This holding pawl is preferably mounted upon a shaft 52 rotatably mounted in suitable bearings in the yoke 12. A torsion spring 53 is coiled about the shaft 52 and has one end engaging the pawl 51 and its opposite end the yoke 12, thereby tending to yieldably hold the pawl against the teeth of the ratchet wheel 23. A similar spring 54 is mounted upon the shaft 37 to normally hold the lifting pawl against the ratchet teeth. By the employment of these two pawls and the operating lever 44 at the forward end of the jack, the lifting member 19 may readily be moved from its horizontal non-lifting position, shown in Figure 2, to its upright or lifting position shown in Figure 1.

In jacks of this type it is desirable that means be provided whereby the movement of the lifting member 19 may be quickly reversed to cause it to be moved from its lifting to its non-lifting position, and in the structure here shown the pawls 36 and 51 which effect the elevating or raising of the lifting member, are also employed to reverse the movement of the lifting member to lower the lifting head. In order to employ the use of the pawls 36 and 51 in reversing the movement of the lifting member 19, means must be provided to automatically overcome the tension of the torsion springs 53 and 54 which normally tend to hold the pawls against the face of the ratchet 23. The means provided for thus overcoming the tension of the springs 53 and 54 is clearly shown in Figures 5, 6 and 7. As here shown, it will be noted that arms 55 and 56 are terminally secured to the adjacent ends of the shafts 52 and 37, respectively, upon which the pawls 51 and 36 are mounted. A block 57, having a rod 58 slidably mounted therein, is pivotally mounted in the arm 56. The upper end of the rod 58 has a head 59 formed thereon in which a notch 61 is provided, adapted to receive a pin 62 secured to the relatively shorter arm 55. The rod 58 is preferably threaded to receive the adjusting nuts 63 and 64 between which and the opposed faces of the block 57 a pair of compression springs 65 and 66 are mounted. A rod 67 connects the head 59 of the rod 58 with an operating rod 68, as particularly shown in Figure 5. The rod preferably has an eye 69 terminally provided thereon to receive the end of the rod 67, and a compression spring 71 is mounted upon the rod 68 between the eye 69 and the guide 72, secured to the side beam 11 of the jack frame. The compression spring 71 tends to constantly force the head 59 into engagement with the pin 62. The opposite end of the operating rod 68 is connected to a bell crank 73 pivotally mounted upon the cross member 17 of the jack frame. When the head 59 is in engagement with the pin 62, as shown in Figures 5, 6 and 7, the bell crank 73 will assume the position shown in dotted lines in Figure 2. In this position, oscillation of the operating lever 44 will reverse the direction of rotation of the ratchet wheel 23 to cause the sector-shaped lifting member 19 to be moved from the position shown in Figure 1 to that shown in Figure 2. When the bell crank is moved to the full line position shown in Figure 2, in which position it is held by the action of the spring 71, the head 59 will be moved out of engagement with the pin 62 in the arm 55 or to the full line position shown in Figure 3. When thus positioned, oscillation of the hand lever 44 will cause the ratchet wheel to be rotated in a direction to elevate the lifting member 19.

In the operation of this novel jack and when the lifting member 19 and head 28 are in normal non-lifting position as shown in Figure 2, the rear end portion will be inserted under the axle of the vehicle with the swiveled lifting head 28 substantially in alignment therewith. The operating lever 44 is then secured to the quadrant 43 by means of the block 40 at such an angle or position as to permit it to be conveniently operated by the user. A foot pedal 74 is provided upon the quadrant 43 for the convenience of the operator for initially operating the lifting pawls 36 to move the lifting head 28 into engagement with the axle of the vehicle. Such initial movement of the lifting mechanism can be accomplished much quicker by the use of the foot pedal than with the operating lever, for when the lever is unlocked from the quadrant 43, the operator can actuate the quadrant very rapidly, it being understood that the quadrant, after each downward stroke, will be returned to its normal starting position by the action of the spring 48. As soon, however, as the lifting head 28 engages the vehicle, the load may be too great to permit the operator to actuate the lifting mechanism by the use of the foot pedal 74, and the operating lever 44 may then be connected to the quadrant and the latter actuated by oscillating the lever 44 as hereinbefore described.

By means of the notches in the quadrant 43 the lever may be relatively adjusted thereon for the convenience of the operator in oscillating it. Thus should the jack be used to lift a car having its body considerably overhanging the axle, the lever may be positioned as shown in Figure 2, where it will be moved to substantially a horizontal position adjacent the floor line when oscillated to lift the car or to actuate the lifting mechanism.

The swiveled lifting head 28 may also be relatively adjusted in its socket by means of the ratchet device 29, which preferably has a hand grip 75 mounted upon the bars 31 for the convenience of the operator in actuating the ratchet device 29 to permit the head to drop, by gravity, to its lowered normal position, shown in Figure 2. The head is manually raised in its socket when it is desired to adjust it therein to increase the lifting range of the jack.

In raising the lifting member 19 from its horizontal to its vertical position, the lifting pawl 36 and the holding pawl 31 will function as is customary in devices of this kind, that is, for each forward stroke of the lever 44, the lifting pawl will engage one of the teeth in the ratchet and rotate it a fraction of a revolution sufficient to permit the holding pawl to engage the next tooth, thereby holding the ratchet against reverse movement while the lifting pawl is being returned to its initial starting position.

When the lifting member 19 and head 28 are lowered, the action of the pawl 36 will be the reverse of that employed when the lifting head is being elevated. When it is desired to lower the head 28 from the position shown in Figure 1 to that shown in Figure 2, the bell crank 73 at the forward end of the jack will be moved from the full to the dotted line position shown in Figure 2, thereby permitting the spring 71 to move the head 59 of the rod 58 towards the pin 62 in the arm 55. Such movement of the head 59 will cause the pin 62 to be received in the notch 61 in the head, thereby operatively connecting the rod with the holding pawl 51 by means of the pin 62 and arm 55. Such connection of the rod 58 with the pawl 51 will cause the block 57 to slide upon the rod as the triangular plates 38 are oscillated upon the shaft 13 by the reciprocal movement of the connecting rods 39. When the pawl is moved to the position shown in Figure 5, it will be noted that the spring 65 between the adjusting nut 63 and the block 57 will be compressed. The force of this spring when thus compressed will cause the holding pawl to be forced against the ratchet 23 while the pressure exerted against the block 57 mounted in the arm 56 will be sufficient to overcome the tension of the torsion spring 54 of the lifting pawl; thereby causing the lifting pawl to be moved out of engagement with the ratchet, as shown, as soon as the holding pawl takes the load. When the pawls are thus positioned, the plates 38 carrying the lifting pawl may be oscillated in the direction indicated by the arrow in Figure 7 without having any effect upon the rotation of the ratchet wheel 23. This will be noted as a result of the lifting pawl being moved out of engagement by the action of the spring 65 when the pawl 36 is initially moved from the position shown in Figure 5. However, when the plates 38 reach the position shown in Figure 7, the tension of the springs 65 and 66 will be neutralized, thereby causing the torsion spring 54 to force the lifting pawl 36 into contact with the ratchet so that when the plates 38 have completed their forward stroke, as shown in Figure 6, the lifting pawl will engage the ratchet and relieve the holding pawl 51 of the load. When the parts are positioned as shown in Figure 6, it will be noted that the compression spring 66 on the rod 58 will be compressed while the spring 65 will be expanded. Such compression of the spring 66 will exert a downward pull upon the rod 58 which will overcome the tension of the torsion spring 53 and will therefore move the holding pawl out of engagement with the ratchet after which the plates 38 carrying the lifting pawl 36 will be moved from the position shown in Figure 6 to that shown in Figure 5, thus completing a cycle of operation in the lowering of the sector-shaped lifting member 19. Thus it will be seen that as long as the head 59 of the rod 58 is in engagement with the pin 62, oscillation of the quadrant 43 will cause the lifting member 19 to be lowered to its normal non-lifting position shown in Figure 2. Obviously, if the load is not too great, the lowering of the lifting member 19 to its normal non-lifting position may be effected by the operation of the foot pedal 74 when the operating lever 44 is unlocked from the quadrant 43.

The operation of this novel jack is therefore accomplished entirely by the oscillation of the quadrant 43 operated either by foot power or hand power, as desired. The same pawls are also used for both raising and lowering the lifting member 19, thereby greatly simplifying the construction of the operating mechanism.

When the head 59 of the rod 58 is disengaged from the pin 62, as shown in Figure 3, the arms 55 and 56 will have no function and the rod 58, carrying the springs 65 and 66, will idle with the movement of the triangular plates 38. By means of the adjusting nuts 63 and 64, the tension of the springs 65 and 66 may be adjusted to the desired degree to overcome the tension of the torsion springs 53 and 54 in the operation of lowering the lifting member 19. It will also be noted by reference to Figures 1 and 3 that when the lifting member 19 is being elevated to lift a load, the major portion of the load will be supported substantially upon the shaft 13 and the wheels 15, thereby relieving the frame of any unnecessary strain with the result that it may be constructed of comparatively light material. By providing two rows of rack teeth upon the lifting member 19, the member and also the lifting head 28 will be prevented from teetering or rocking upon its support, thereby providing a very rugged and substantial lifting apparatus. In moving the lifting member 19 from its normal non-lifting position shown in Figure 2 to the intermediate position shown in Figure 3, the supporting bars 31 will have a longitudinal movement caused by the arcuate movement of the member 19. From the position shown in Figure 3 to that shown in Figure 1 the bars 31 will have a forward movement until the ends of the slots 33 engage the shaft 32, after which the upward movement of the member 19 will be guided by the oscillating movement of the bars 31.

I claim as my invention:

1. A jack comprising a frame, a member having a sliding connection with one end of said frame, a lifting member mounted at the opposite end of the frame and having a pivotal connection with said first-mentioned member, a rack on said lifting member, a pinion mounted for engagement with said rack, a ratchet device connected with said pinion for operating it and means for operating said ratchet device to raise said lifting member.

2. A jack comprising in combination a wheeled frame, a bar mounted for swinging movement thereon, a lifting member pivotally connected to said bar, a pair of spaced rack bars on said lifting member, pinions engaging said rack bars, a ratchet wheel interposed between said pinions and secured thereto, pawls engaging said ratchet wheel, an operating lever for said pawls and ratchet, said lever having an adjustable connection with said pawls whereby it may be operated at various angles.

3. A jack comprising a wheeled frame, a lifting member mounted thereon, curved racks on said lifting member, spaced pinions engaging said racks, opposed flanges also on said lifting member, rollers engaging said flanges to guide said member when being moved from one position to another, and mechanism for operating said pinions and said lifting member.

4. A jack comprising a frame, a lifting member mounted thereon, bars pivotally connected to said lifting member and having pivotal and sliding connections with said frame, means for actuating said lifting member, and cooperating means on said lifting member and said frame to guide said lifting member during its initial movement, said bars functioning to guide and support said lifting member near the completion of its lifting movement.

5. A jack comprising in combination, a frame, a lifting member mounted thereon, a ratchet wheel, a rack and pinion connecting said lifting member with said ratchet wheel, a holding pawl pivotally mounted on said frame and yieldably held against said ratchet wheel, an operating pawl having an oscillating movement on said frame and yieldably held against said ratchet wheel, an arm operatively connected with said operating pawl and having a notched rod slidably mounted thereon, spring members mounted on said rod, an arm also operatively connected to said holding pawl and having means for engaging said notch to yieldingly hold said pawls together, said spring members functioning to alternately move said pawls into and out of engagement with said ratchet wheel to reverse the direction of rotation of said lifting member to lower the jack.

6. A jack comprising an elongated, low wheeled frame, having an axle transverse to the same at one end and having a pivot-shaft at the opposite end, a pinion rotatable upon said axle within the frame, a lifting element independently, guidingly held within the frame, and having a rack transmittibly engaging at one end with the pinion from above, said element and rack extending, when in this inoperative position, away from the pinion toward the opposite end of the frame, and being substantially horizontally disposed and substantially housed within the frame when at lowermost level, a frame-like lifting link pivoted by one end to that end of the lifting element adjacent the pinion, and slotted at its opposite end, with the slot slidably engaging about said pivot-shaft, and means for applying power to rotate the pinion, including a pawl mechanism mounted upon the axle and frame, a quadrant pivoted centrally upon said pivot-shaft, an operating lever having latch means engaging the quadrant, and a link operatively connecting said rack and pawl mechanism.

7. A jack comprising a frame, a lifting member mounted thereon adapted for movement from a supine position to a substantially vertical position, teeth on said lifting member, a pinion for coacting therewith, means for rotating said pinion, said pinion having an annular shoulder for rolling against said lifting member, a roller mounted on said frame for also rolling against said lifting member, said annular shoulder and said roller serving to support said lifting member and a bar connected to said lifting member and connected to the frame permitting said lifting member to be supported on said annular shoulder and said roller during its initial movement but causing the lifting member to be supported by the annular shoulder and the bar during the completion of the lifting movement.

8. A jack comprising a sector shaped lifting member and support therefor, means for raising said member from its normal inactive lowered position to an upright lifting position, said means including a curved rack on said sector shaped lifting member, a pinion in engagement therewith supported on said frame and a ratchet device for imparting rotation to said pinion and a bar pivotally connected to said lifting member and having a pivotal and sliding connection with said frame for supporting said lifting member after it has been moved to raised position.

9. A jack comprising a frame and a lifting member having a curved rack, a pinion on the frame for cooperating therewith, and a bar pivoted to the lifting member at one end and pivotally and slidably connected at its other end to the frame, said bar functioning only when the lifting member nears the completion of its lifting movement due to the pivotal and slidable connection between one end of the bar and said frame.

10. A jack comprising a frame and a lifting member having a curved rack, a pinion on the frame for cooperating therewith, and a bar pivoted to the lifting member at one end and a slot and pin connection between said frame and the free end of said bar, said slot and pin connection functioning to cause the bar to brace the lifting member when the lifting member nears the completion of its lifting movement.

11. A jack comprising an elongated, low wheeled frame, a lifting element independently, guidingly held within the frame, said lifting member being adapted for movement from a supine position and substantially housed within the frame when in such position to a substantially vertical position, and a bar pivotally connected to said lifting member and having a pivotal and sliding connection with said frame.

12. A jack comprising an elongated, low wheeled frame, having an axle transversing the same at one end and having a pivot-shaft at the opposite end, a pinion rotatable upon said axle within the frame, a lifting element independently, guidingly held within the frame, and having a rack transmittibly engaging at one end with the pinion from above, said element and rack extending, when in this inoperative position, away from the pinion toward the opposite end of the frame, and being substantially horizontally disposed and substantially housed within the frame when at lowermost level, a frame-like lifting link pivoted by one end to that end of the lifting element adjacent the pinion, and slotted at its opposite end, with the slot slidably engaging about said pivot-shaft, and means for applying power to rotate the pinion.

13. A jack comprising an elongated, low wheeled frame, having an axle transversing the same at one end and having a pivot-shaft at the opposite end, a pinion rotatable upon said axle within the frame, a lifting element independently, guidingly held within the frame, and having a rack transmittibly engaging at one end with the pinion from above, said element and rack extending, when in this inoperative position, away from the pinion toward the opposite end of the frame, and being substantially horizontally disposed and substantially housed within the frame when at lowermost level, a frame-like lifting link pivoted by one end to that end of the lifting element adjacent the pinion, and slotted at its opposite end, with the slot slidably engaging about said pivot-shaft, a lifting head carried by the end of said frame-like link adjacent the lifting element and means for applying power to rotate the pinion.

14. A jack comprising an elongated, low wheeled frame, a lifting element independently, guidingly held within the frame, said lifting member being adapted for movement from a supine position and substantially housed within the frame when in such position to a substantially vertical position, and a bar pivotally connected to said lifting member and having a pivotal and sliding connection with said frame and a lifting head carried by said bar.

In witness whereof, I have hereunto set my hand this 16th day of November, 1925.

LEONARD D. NILSON.